United States Patent [19]
Kovacs

[11] Patent Number: 4,768,326
[45] Date of Patent: * Sep. 6, 1988

[54] BAG SEALING BAR

[75] Inventor: Lloyd Kovacs, Sheboygan, Wis.

[73] Assignee: Hayssen Manufacturing Company, Sheboygan, Wis.

[*] Notice: The portion of the term of this patent subsequent to Sep. 15, 2004 has been disclaimed.

[21] Appl. No.: 62,454

[22] Filed: Jun. 12, 1987

Related U.S. Application Data

[63] Continuation-in-part of Ser. No. 887,559, Jul. 17, 1986, Pat. No. 4,693,058.

[51] Int. Cl.$^4$ .................. B65B 51/30; B65B 51/14; B65B 9/12
[52] U.S. Cl. ........................... 53/373; 53/551; 156/583.3
[58] Field of Search .............. 53/551, 552, 379, 451, 53/373; 156/583.3, 581

[56] References Cited

U.S. PATENT DOCUMENTS

| | | | |
|---|---|---|---|
| 3,227,597 | 1/1966 | Wilson | 156/583.3 |
| 3,578,535 | 5/1971 | Göhlfennen | 156/583.3 X |
| 3,752,725 | 8/1973 | Freeman | 156/583.3 X |
| 3,830,681 | 8/1974 | Wilson | 156/583.3 X |
| 4,024,692 | 5/1977 | Young . | |
| 4,069,643 | 1/1978 | Young . | |
| 4,082,941 | 4/1978 | Sukow et al. | 219/243 |
| 4,115,182 | 9/1978 | Wildmoser | 156/583.3 X |
| 4,144,003 | 3/1979 | Berkowitz | 418/113 |
| 4,353,196 | 10/1982 | Beer | 53/451 |
| 4,546,596 | 10/1985 | Cherney | 53/551 X |
| 4,693,058 | 9/1987 | Kovacs | 53/552 |

FOREIGN PATENT DOCUMENTS 2255762  5/1973  Fed. Rep. of Germany ... 156/583.3

Primary Examiner—Horace M. Culver
Attorney, Agent, or Firm—Senniger, Powers, Leavitt and Roedel

[57] ABSTRACT

A sealing bar for heat sealing a length of heat-sealable material, such as tubing, to form packages and the like. The sealing bar has a metal surface adapted for pressure engagement with the heat-sealable material for flattening it and heating it. A slot extends substantially through the bar, the slot being arranged to define the portion of the bar between the slot and the surface as a relatively thin resiliently flexible metal bridge. The bridge is engageable with a portion of the flattened heat-sealable material, such as a portion of tubing having a longitudinal seam or a gusset, thicker than other portions of the heat-sealable material and the bridge is adapted resiliently to yield on engagement with the thicker portion of the material.

6 Claims, 4 Drawing Sheets

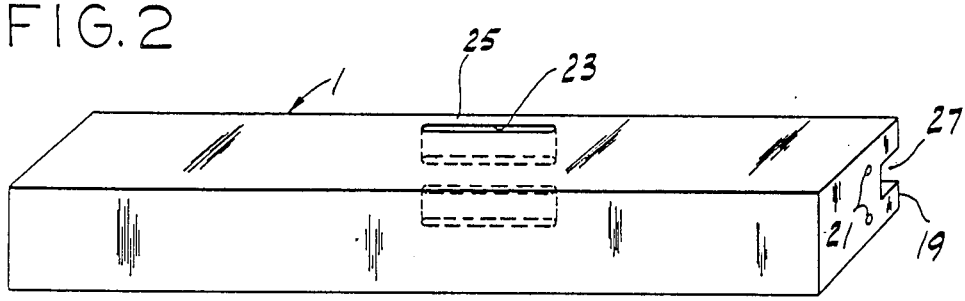
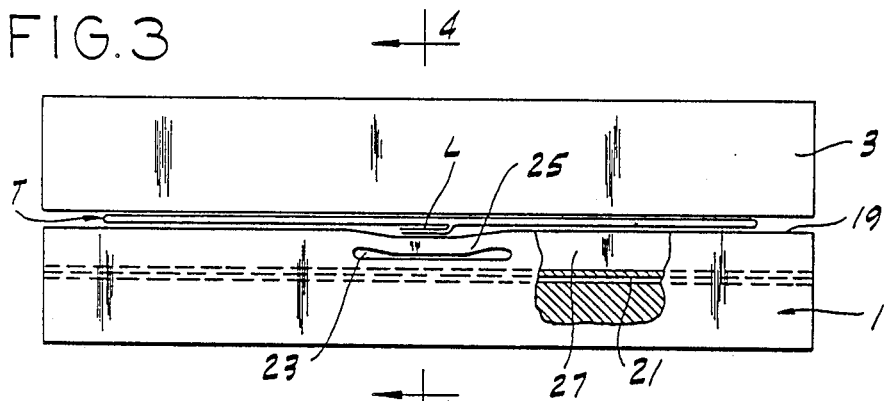
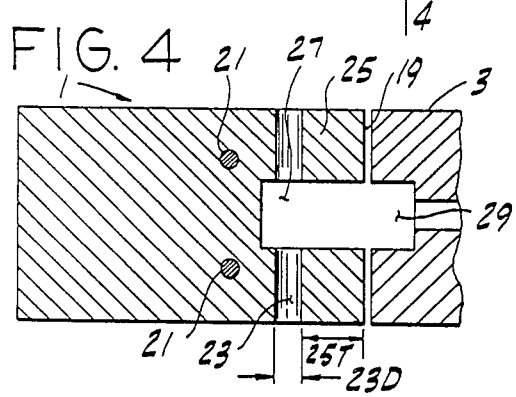
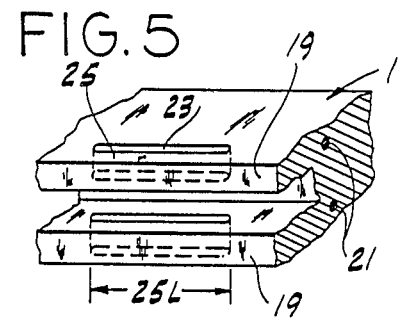
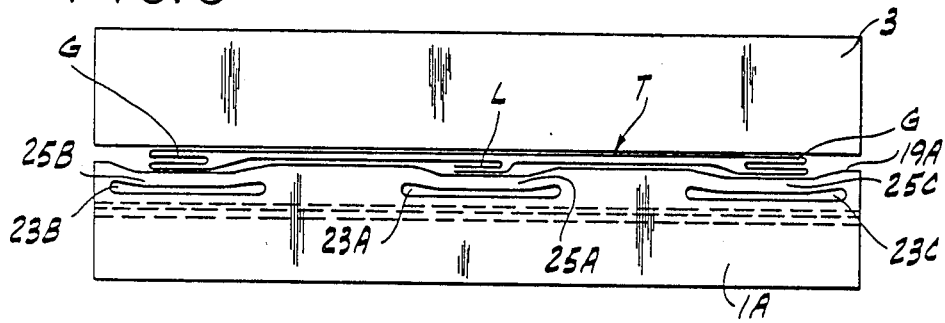

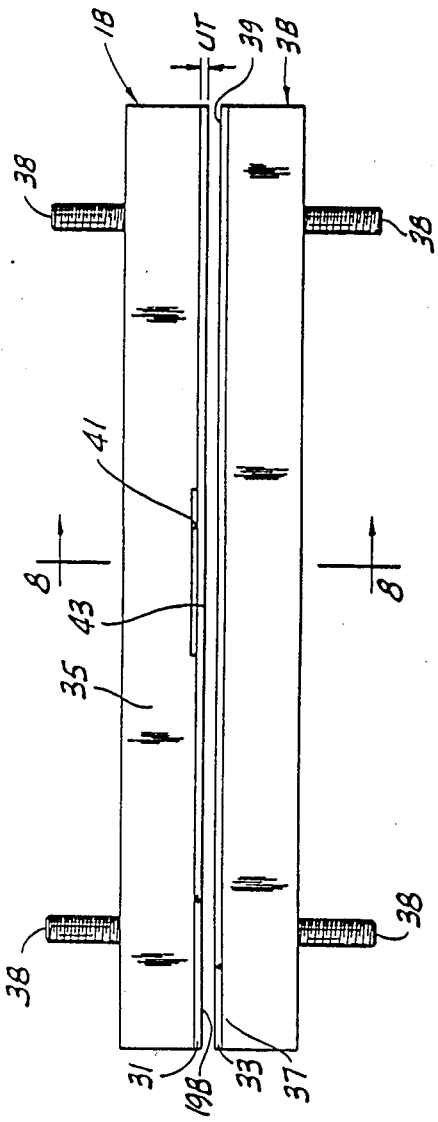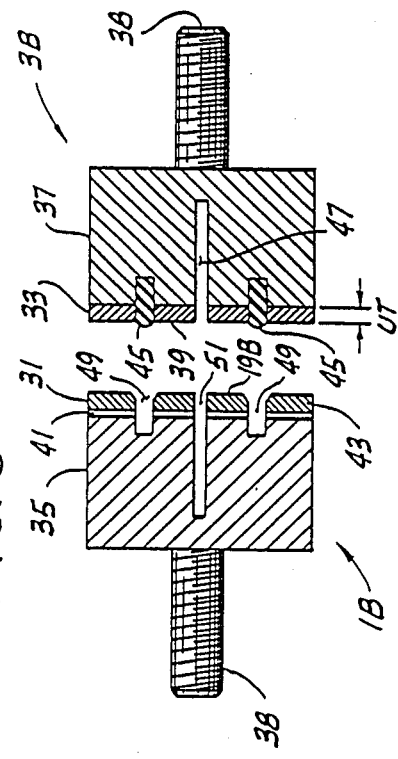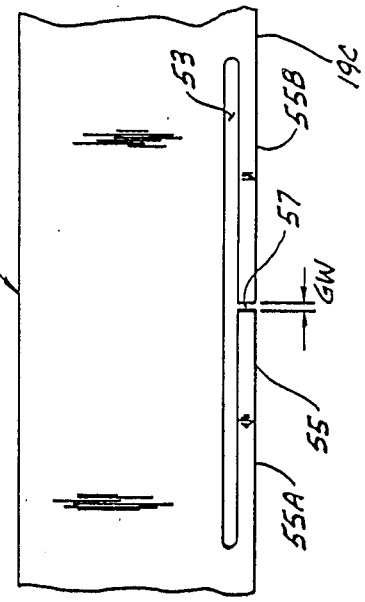

BAG SEALING BAR

This is a continuation-in-part of application Ser. No. 887,559, filed July 17, 1986 and now U.S. Pat. No. 4,693,058, issued Sept. 15, 1987.

BACKGROUND OF THE INVENTION

This invention relates generally to sealing bars for heat sealing a length of heat-sealable material.

This invention has particular (albeit not exclusive) application to sealing bars for form-fill-seal packaging apparatus. The majority of form-fill-seal packaging machines form tubing having a longitudinal back seam, such as an overlap seam or a "fin seam". The tubing is then flattened and heat seals are formed transversely to the axis of the tubing (and transversely to the longitudinal seam) by heat sealing bars to form packages. However, the transverse seals are very difficult to form at high speed without imperfections, such as weak or inconsistant seals. One cause of these imperfections is believed to be variations in the thickness of tubing (e.g., variations in thickness caused by gussets or seams).

For example, flattened tubing having an overlap seal has an increased thickness portion roughly 50 percent thicker than the flattened tubing generally (i.e., two layers of material at the seam plus one layer of material at the opposite side of the tubing is 50 percent thicker than the two layers of material generally found at opposite sides of the flattened tubing). In the case of a fin seal, the increased thickness portion is roughly twice as thick as the flattened tubing generally (i.e., two layers of material at the seam plus one layer adjacent the seam plus one layer at the opposite side of the tubing is twice as thick as two layers of material).

Since the tubing is of varied thickness, conventional sealing bars may not apply even pressure to the flattened tubing. Consequently, the pressure applied is likely to be too high at the thick seam portion, thus forcing all or most of the sealant away from the seam, and too low adjacent the seam portion, which may result in insufficient heating of the tubing adjacent the seam. In addition, the extra thickness of the seam may cause the sealing bars to bow out from the tubing, which may contribute to the problem since intimate contact of tubing material is important for heat sealing. These problems are particularly acute with some of the modern film materials, such as saran coated polypropylene, which may have a sealant coating which is only 0.10 mil thick.

Several attempts have been made to solve these problems. Probably one of the more common approaches has been to apply a flexible heat resistant material, such as silicone rubber, to the sealing bars to accommodate seams and gussets in the tubing. Rubber, however, is not heat conducting, and therefore it reduces the rate of heat transfer to the tubing and it takes longer to heat up to operating temperature. In addition, it has been found to be difficult to machine or mold and match the desired die tooth configuration into the rubber.

Another approach has been to cut away a portion of the heat sealing surface of the sealing bar to provide a relief for a longitudinal seam. One problem with this approach is that the longitudinal seam may "wander from side to side" and the overlap may not always be the same size, and thus this approach has not been found to be practicable. Yet another approach, which has been commercially applied, has been to precision grind teeth into the sealing surface, instead of machining the surface with a milling cutter. This approach reduces the severity of the sealing problems but does not eliminate them.

SUMMARY OF THE INVENTION

Among the several objects of the invention may be noted the provision of an improved sealing bar, particularly for sealing tubing having a longitudinal seam or gussets to form packages, thereby to improve the strength and quality of the seals for such packages; the provision of such a sealing bar that may be used on high-speed packaging machines such as form-fill-seal packaging machines; the provision of such a sealing bar which is of relatively low cost and which may be installed at low cost; and the provision of such a sealing bar which is durable.

The sealing bar of this invention is used for heat sealing a length of heat-sealable material, such as tubing, to form packages and the like. The sealing bar has a metal surface adapted for pressure engagement with the heat-sealable material for flattening it and heating it. A slot extends substantially through the bar adjacent the surface of the bar, the slot being arranged to define the portion of the bar between the slot and the surface as a relatively thin resiliently flexible bridge. The bridge is engageable with a portion of the flattened heat-sealable material, such as a portion of tubing having a longitudinal seam or a gusset, thicker than other portions of the material and the bridge is adapted resiliently to yield on engagement with the thicker portion of the material.

Other objects and features will be in part apparent and in part pointed out hereinafter.

BRIEF DESCRIPTION OF THE DRAWINGS

FIG. 2 is a perspective of the sealing bar of FIG. 1;

FIG. 3 is a top plan of the sealing bars of FIGS. 1 and 2, portions of the sealing bar of the present invention being broken away to illustrate details;

FIG. 4 is an enlarged cross sectional view taken along line 4—4 of FIG. 3, showing a knife slot in the sealing bar;

FIG. 5 is an enlarged partial perspective of the sealing bar of FIG. 4;

FIG. 6 is a top plan similar to FIG. 3, showing another embodiment of the invention;

FIG. 7 is a top plan similar to FIGS. 3 and 6, showing yet another embodiment of the invention;

FIG. 8 is an enlarged cross sectional view taken along line 8—8 of FIG. 7;

FIG. 9 is an enlarged partial top plan of a sealing bar similar to the sealing bars of FIGS. 1–8, showing an additional embodiment of the invention;

Corresponding reference characters indicate corresponding parts throughout the several views of the drawings.

DESCRIPTION OF PREFERRED EMBODIMENTS

Figure 1:
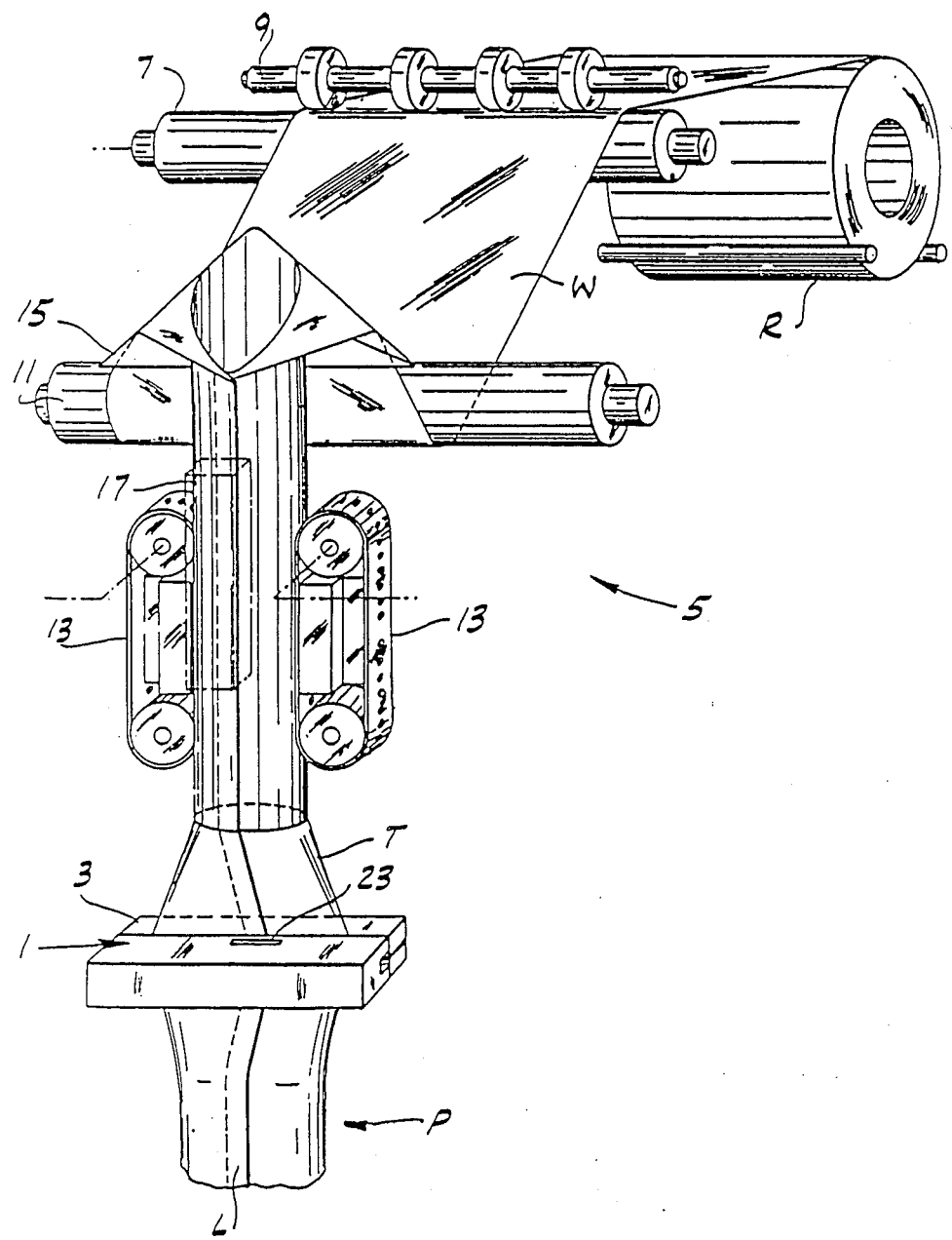
FIG. 1 is a perspective of a vertical form-fill-seal machine, illustrating a sealing bar of this invention.

Now referring to the drawings, a sealing bar of the present invention is designated in its entirety by the reference numeral 1. As illustrated in FIG. 1, sealing bar 1 is cooperable with a sealing bar designated 3 for heat sealing a length of heat-sealable material, such as tubing T formed in a form-fill-seal packaging machine, such as the vertical form-fill-seal packaging machine generally indicated at 5. The form-fill-seal packaging machine may be of the type described in coassigned U.S. Pat. No. 4,288,965, issued Sept. 15, 1981. It will be understood, however, that the sealing bar of present invention is applicable to any type of form-fill-seal machine and that it has application to other types of heat-sealing apparatus as well.

As shown in FIG. 1, packaging machine 5 pulls web material W from a supply roll R, forms tubing T from the web material, and then makes packages P from the tubing. More specifically, the packaging material is pulled from supply roll R by web feed rolls 7, 9, and then fed by guide roll 11 onto a forming shoulder 15, which forms it into tubing T. As tubing T is formed, it is heat sealed by sealing means (diagrammatically indicated at 17) to form a longitudinal seam L thereon. Tubing T is drawn downward by tube feeding means 13 and thereby taken-up as it is fed onto forming shoulder 15 with the take-up such that the web W is pulled over the forming device under tension. After filling tubing T with product, the tubing may be sealed by sealing bars 1 and 3, and cut by a knife (not shown) to form package P and simultanously seal the bottom end of the tubing. Packaging machine 5 is then ready for another cycle of forming, filling, and sealing tubing.

As shown in FIG. 4, sealing bar 1 is of rectangular cross-section and has a front rectangular surface 19 adapted for pressure engagement with tubing T for flattening and heating it. Heat may be provided, for example, by heating wires 21 shown in FIGS. 3 through 5. As illustrated, surface 19 lies in a generally vertical plane, although it will be understood that it may assume other orientations in other sealing machines. A slot 23 extends substantially through sealing bar 1 and lies in a vertical plane substantially parallel to surface 19. As shown in FIG. 3, slot 23 is disposed adjacent surface 19 and thus defines a portion 25 of bar 1 between the slot and the surface as a relatively thin resiliently flexible bridge 25. The bridge is preferably located approximately midway between the ends of the sealing bar and is engageable with the longitudinal seam L of the tubing. Bridge 25 is adapted resiliently to yield on engagement with this thicker portion of the tubing (see FIG. 3), and thereby accomodate the longitudinal seam L. The thickness 25T and/or length 25L of the bridge may be varied according to the thickness of the longitudinal seam L that must be accommodated. For example, the bridge may have a length 25L about 50% greater than the normal width of seam L and a thickness 25T of about 3 mm, with the slot 23 having a dimension 23D of about 1.5 mm. The sealing bar 1 and bridge 25 may be of an aluminum or steel alloy (e.g., a high-temperature, nickel-steel alloy sold under the trade designation "Hastelloy" by Cabot Corporation of Kokomo, Ind.). The specific alloy used is selected on the basis of its ability to appropriately flex so that the bridge sufficiently accommodates and sufficiently presses against the seam to provide a good seal across the entire width of the tubing.

Conventional means such as an extensible and retractable knife (not shown) is provided for cutting the tubing with the tubing being sealed at both sides of the cut. The sealing bar 1 has a knife slot 27 therein extending back from and substantially perpendicular to surface 19, as shown in FIGS. 2 through 5. Knife slot 27 extends back from surface 19 a depth sufficient to accommodate the stroke of a knife after it severs the tubing T, such as a depth further back from the surface than bridge forming slot 23, as shown in FIG. 4. As a result, it will be observed that bridge-forming slot 23 and knife slot 27 intersect. Sealing bar 3 is also provided with a knife slot 29, the knife (not shown) being movable through a stroke in which it extends from slot 29 through tubing T to sever it with the leading edge of the knife projecting into slot 27, and then retracts back into slot 29.

FIG. 6 illustrates another embodiment of the invention wherein a sealing bar 1A is particularly adapted for accommodating gussets in addition to a longitudinal seal L. Sealing bar 1A has three bridge-forming slots 23A, 23B and 23C, which extend through the bar substantially parallel to surface 19A and substantially parallel to one another. The slots are spaced at intervals along the sealing bar 1A and lie in a common plane generally parallel to and adjacent surface 19A. Slot 23A, referred to as a center slot, is located generally at the middle of the sealing bar and defines the portion of the bar between the slot and surface 19A as a relatively thin flexible central bridge 25A. Slots 23B and 23C, referred to as outer slots, are located on opposite sides of the center slot 23A adjacent the ends of the bar and define the portions of the bar between the slots and surface 19A as relatively thin flexible outer bridges 25B and 25C. The central bridge 25A is particularly adapted resiliently to yield on engagement with a portion of the flattened tubing having a longitudinal seam L. It will be observed in this respect that bridge 25A is similar to bridge 25 of the one-bridge design. Bridges 25B and 25C are particularly adapted resiliently to yield on engagement with portions of the flattened tubing having gussets G, as shown in FIG. 6.

Heat sealing bar 3 may or may not be of the same design as sealing bar 1 or 1A. However, it is contemplated that sealing bar 3 may be of conventional design.

FIGS. 7 and 8 illustrate yet another embodiment of the invention wherein sealing bars 1B and 3B are provided with separate sealing face plates 31 and 33, respectively, which are attached to the bodies 35 and 37, respectively, of the sealing bars by any suitable means, such as by soldering. The face plates 31, 33 are of substantially uniform thickness UT (e.g., 3 mm), and they have conventional serrations (not shown) in their sealing surfaces 19B and 39, respectively. Means, such as indicated at 38, are provided for attaching the sealing bars to a form-fill-seal packaging machine.

As shown in FIG. 7, sealing bar 1B has a central slot 41 extending vertically therethrough substantially parallel to surface 19B. The slot is formed by cutting (e.g. milling) a recess in the body 35 of the sealing bar and then securing the sealing face plate 31 in position. The portion of the sealing face plate 31 between the slot and the sealing surface 19B forms a relatively thin flexible central bridge 43 similar to bridge 25 described above in the embodiment of FIGS. 2–5. Bridge 43 is adapted to yield on engagement with the portion of the flattened tubing having the longitudinal seam. Outer bridges (not shown) similar to the outer bridges 25B and 25C of FIG. 6 may also be provided in the sealing bar of FIGS. 7 and 8.

The sealing face plates 31, 33 of bars 1B and 3B, respectively, are preferably of highly corrosion resistant material since corrosive gases are released while tubing T is sealed. The high-temperature, nickel-steel alloy sold under the trade designation "Hastelloy" by Cabot Corporation of Kokomo, Ind. is recommended. The sealing bar bodies 35 and 37 may be of aluminum alloy, such as an extrusion of 7075-T6 Aluminum. The sealing face plates and sealing bar bodies may be heat treated or coated to provide further protection against corrosion.

Referring to FIG. 8, two spaced-apart silicone rubber strips 45 extend longitudinally of the sealing bar 3B on opposite sides of knife slot 47. The strips 45 project outwardly beyond the face plate 33 of the sealing bar and are engageable with tubing T when the sealing bars are closed for forcing portions of the tubing into grooves 49 extending longitudinally of the sealing bar 1B on opposite sides of knife slot 51. This serves to tension the tubing T in the area of the knife slots 47, 51.

FIG. 9 shows an additional embodiment of the invention wherein the sealing bar 1C has a slot 53 and a split bridge 55. Bridge 55 is split (as by cutting) transversely of the bridge to form two cantilever bridge sections 55A and 55B. Cantilever sections 55A, 55B are relatively thin and flexible, and are adapted resiliently to yield on engagement with the portion of flattened tubing having the longitudinal seam or gusset. The free ends of the cantilever bridge sections are separated by a gap indicated at 57. This gap 57 is sufficiently wide to allow the cantilever sections 55A, 55B to flex without interference from each other but no wider so that the area of tubing T that the sealing bar does not press against is minimized. For example, gap 57 may have a width GW of about 0.003–0.005 in. or approximately 1 mm. It is believed to be advantageous for bridge 55 to be split since this serves to reduce stress, especially tensile stress, in the bridge when it flexes.

Figure 10:
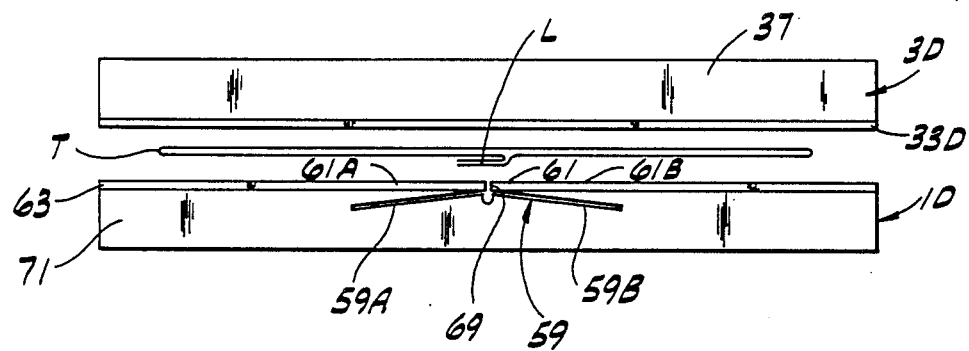
FIG. 10 is a top plan similar to FIGS. 3, 6 and 7, showing still another embodiment of the invention.
Figure 11:
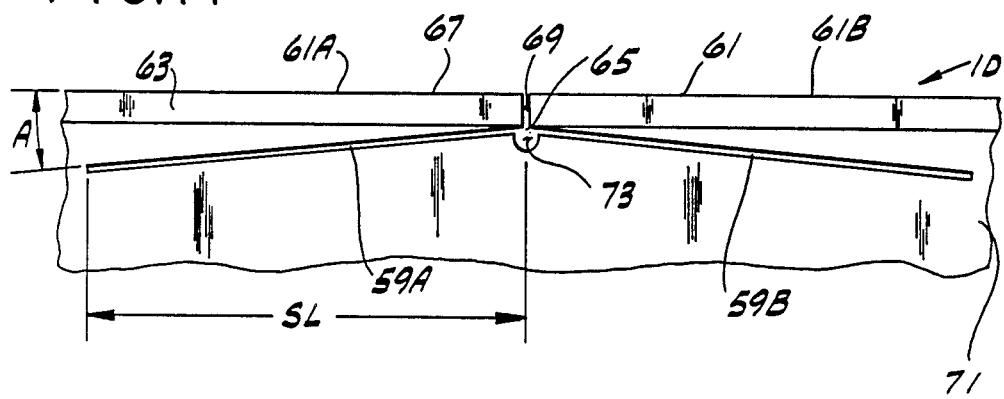
FIG. 11 is an enlarged partial top plan of the sealing bar of FIG. 10.

FIGS. 10 and 11 show another embodiment of the invention wherein the sealing bar 1D has a generally V-shaped slot therein generally indicated at 59, a split bridge 61 similar to the split bridge 55 of FIG. 9, and a sealing face plate 63 of highly corrosion resistant material similar to the sealing face plates 31, 33 of FIG. 7. This V-slot design is preferred over parallel slot configuration (FIGS. 2–9) in certain instances, as where the sealing bar body 71 is of steel and the sealing face plate 63 is of the aforementioned Hastelloy alloy. In such instances it has been found that the angled-slot design provides for a more consistent transfer of heat to the sealing surface of the bar, thereby insuring a substantially uniform temperature over the entire surface.

The slot 59 has an apex 65 and two diverging slot portions 59A and 59B angling inwardly away from the surface 67 of the sealing bar 1D at relatively shallow angles (e.g., an angle A of approximately 5–6 degrees) with respect to the surface of the bar. The bridge 61 is split transversely of the sealing bar 1D to form two cantilever bridge sections 61A and 61B adapted resiliently to yield on engagement with the thicker portions of the heat-sealable material. The free ends of the bridge sections 61A and 61B define a gap 69 therebetween extending inwardly from the surface 67 of the sealing bar 1D to the apex 65 of the slot 59.

Each bridge section 61A, 61B is of generally triangular shape as viewed in FIGS. 10 and 11 with a respective slot section 59A or 59B defining the hypotenuse of the triangle and the gap 69 truncating or cutting off one apex of the triangle. In other words, each bridge section 61A, 61B is tapered toward the gap 69 with the result that the flexibility of the bridge sections increases toward the gap. Preferably, each bridge section 61A, 61B has a length SL of approximately 1.75 in. (45 mm), and a thickness tapering from approximately 0.28 in. (7 mm) to approximately 0.125 in. (3 mm) adjacent the gap 69.

To facilitate cutting the V-shaped slot 59 in the body 71 of the sealing bar 1D, a cylindric bore 73 may be formed through the bar 1D in the direction of the depth of the slot and generally parallel to the surface 67 of the bar. The bore 73 provides a suitable surface for machining the slot portions 59A, 59B into the bar at an appropriate angle A with respect to the face 67 of the sealing bar. It will be observed that, if the cylindric bore 73 is formed in the direction of the depth of the slot (i.e., inwardly with respect to surface 67), it also serves to relieve the apex 65 of the V-shaped slot 59, thereby increasing the amount the free ends of the bridge sections 61A and 61B may flex without binding on the body 71 of the sealing bar adjacent the apex of the slot.

As noted above, while the sealing bar 1 of the present invention has particular application in form-fill-seal packaging apparatus, it will be apparent that it is useful for essentially any type of heat sealing operation wherein the length of heat-sealable material being heat sealed is of varying thickness.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A sealing bar for heat sealing a length of heat-sealable material, such as tubing, to form packages and the like, said bar having a metal surface adapted for pressure engagement with the heat-sealable material for flattening it and heating it, said bar having a slot extending substantially therethrough adjacent said surface, said slot being arranged to define the portion of the bar between the slot and said surface as a relatively thin resiliently flexible metal bridge which is engageable with a portion of the heat-sealable material, such as a portion of tubing having a longitudinal seam or a gusset, thicker than other portions of the flattened material, and adapted resiliently to yield on engagement with said thicker portion of the material.

2. A sealing bar as set forth in claim 1 wherein the slot is generally V-shaped.

3. A sealing bar as set forth in claim 2 wherein the V-shaped slot has an apex and two diverging slot portions angling inwardly away from said surface of the bar.

4. A sealing bar as set forth in claim 3 wherein said bridge has a transverse split therein forming two cantilever bridge sections adapted resiliently to yield on engagement with said thicker portions of the heat-sealable material.

5. A sealing bar as set forth in claim 4 wherein the bridge sections define a gap therebetween extending inwardly from said surface to the apex of the slot.

6. A sealing bar as set forth in claim 5 further comprising a cylindric bore through the bar at the apex of the slot and in the direction of the depth of the slot.

* * * * *